Jan. 2, 1951 C. JOHNSON 2,536,184
PRESSURE FLUID FOLLOW-UP SERVOMOTOR
Filed April 13, 1945 3 Sheets-Sheet 2

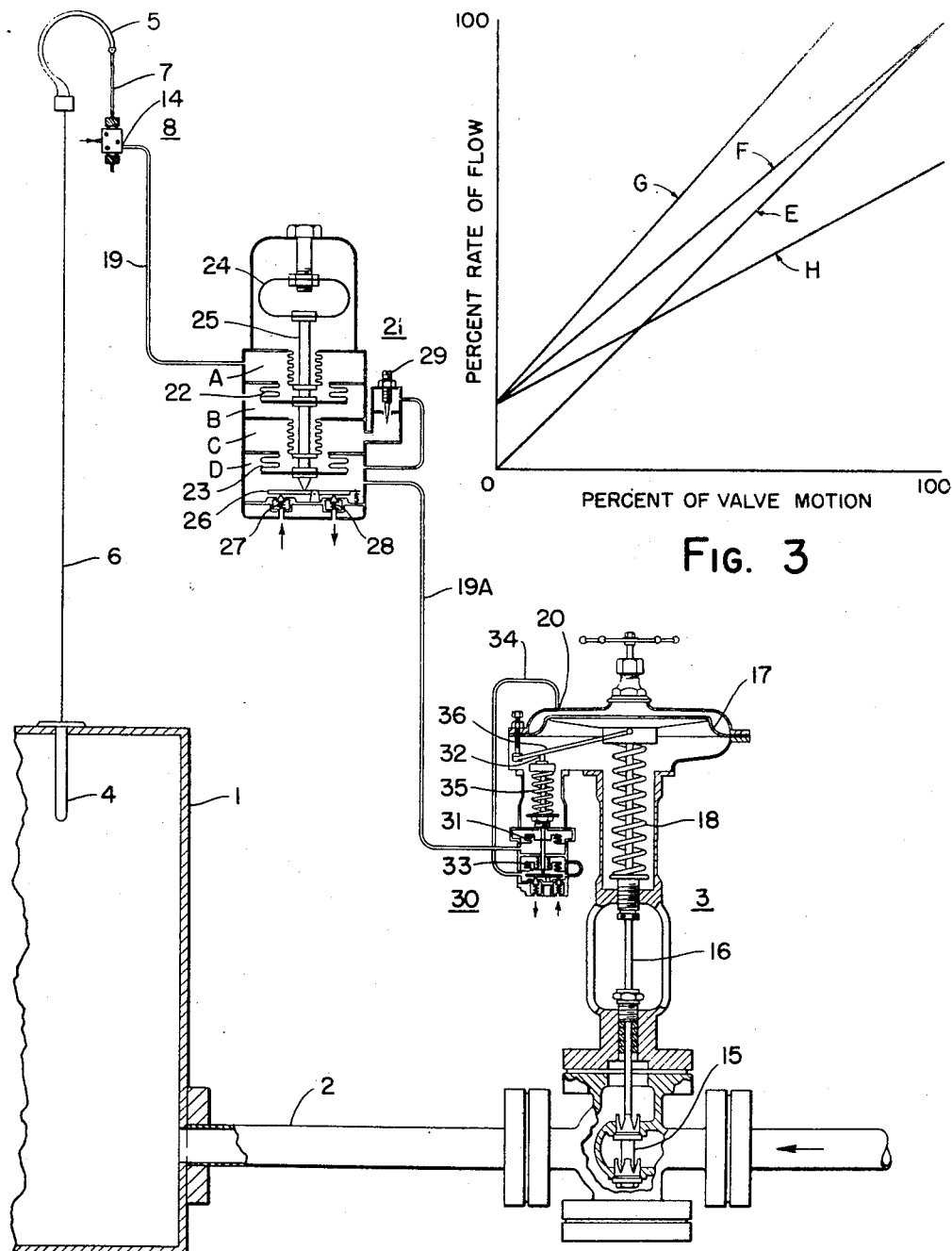
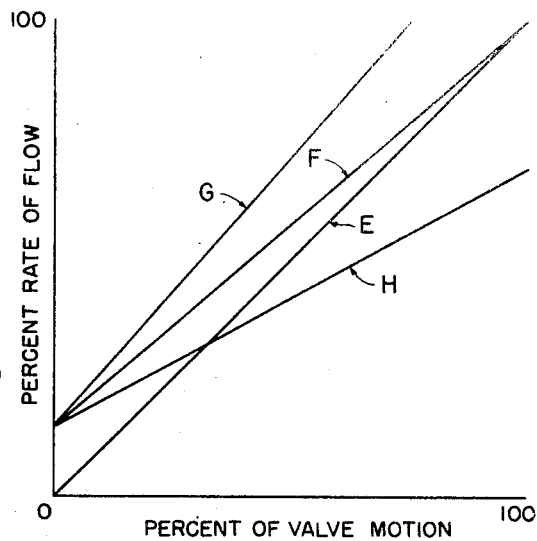
Fig. 3
Fig. 1

INVENTOR.
CLARENCE JOHNSON
BY
Raymond W. Jimkins
ATTORNEY

Jan. 2, 1951 C. JOHNSON 2,536,184
PRESSURE FLUID FOLLOW-UP SERVOMOTOR
Filed April 13, 1945 3 Sheets-Sheet 3
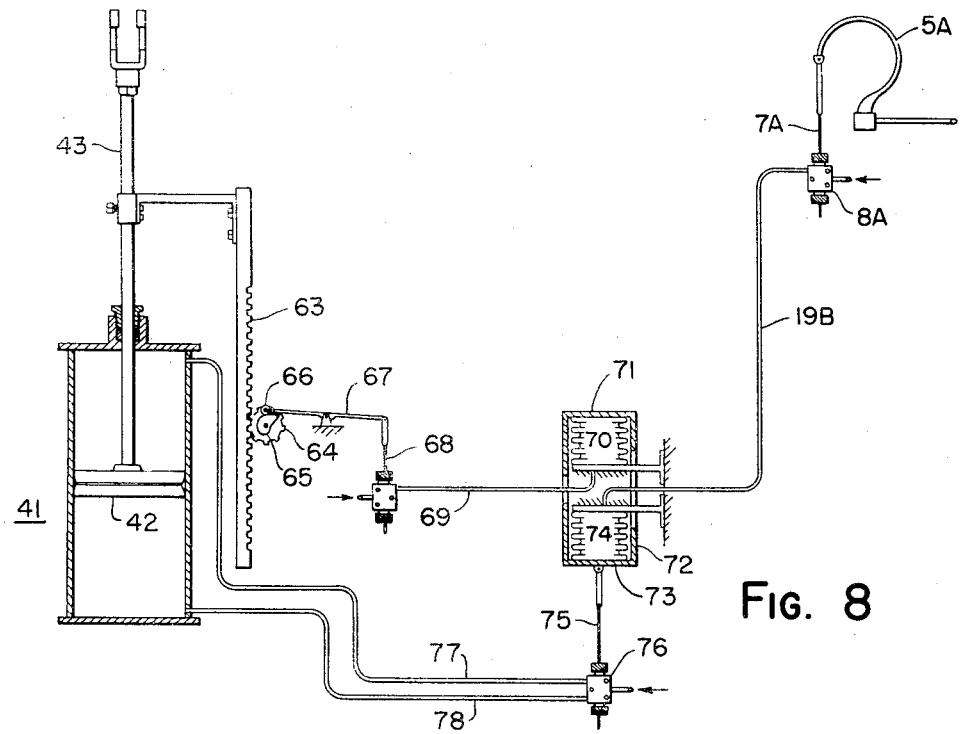
FIG. 8
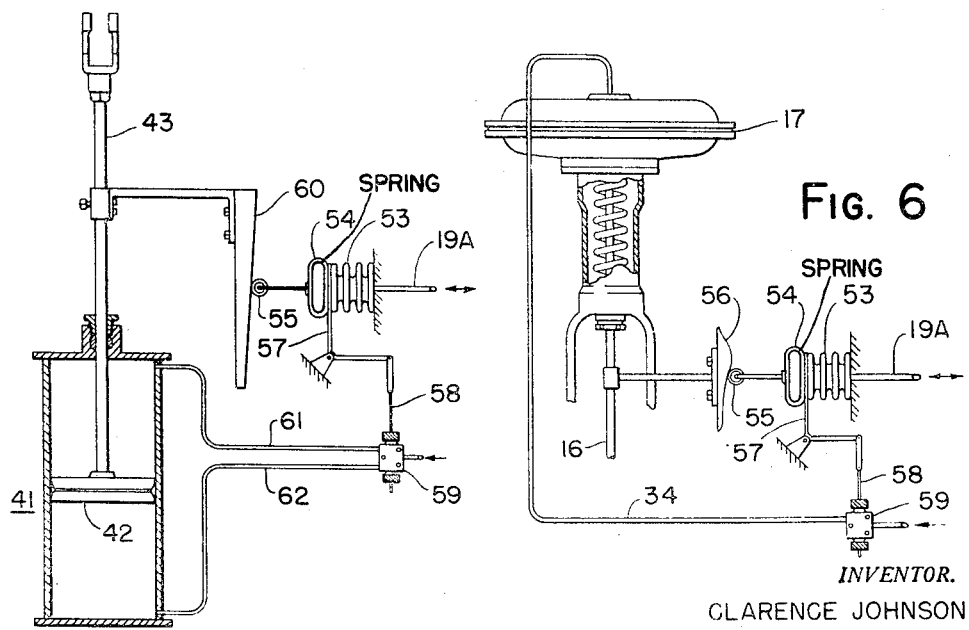
FIG. 7
FIG. 6
INVENTOR.
CLARENCE JOHNSON
BY
Raymond W. Jenkins
ATTORNEY Patented Jan. 2, 1951

2,536,184

UNITED STATES PATENT OFFICE 2,536,184

PRESSURE FLUID FOLLOW-UP SERVOMOTOR

Clarence Johnson, South Euclid, Ohio, assignor to Bailey Meter Company, a corporation of Delaware Application April 13, 1945, Serial No. 588,174

3 Claims. (Cl. 121—41)

This invention relates to control systems wherein a valve or other device for regulating an agent affecting a controlled condition is positioned by a fluid pressure servo-motor. In such systems a loading pressure is usually established by a measuring controller in accordance with the relation of the controlled condition to a desired standard and the loading pressure is utilized either directly or through suitable relays to operate the servo-motor. Preferably, upon departure of the controlled condition from predetermined standard value, the controller senses the amount and rate of departure and initiates control effects instrumental in returning the controlled condition toward or to the desired value.

In order that the controlled condition may be maintained without undue departure from the standard, it is desirable that changes in loading pressure be proportional to changes in the controlled condition, and in some cases that the loading pressure be further continuously modified at a rate proportional to the amount of deviation of the controlled condition from the standard. Reset and derivative control may be superimposed upon the proportional control in accordance with the lag and capacity factors of the system.

It is apparent that small changes in the controlled condition will produce minute changes in the loading pressure, and that slight deviations in the controlled condition from the standard will produce a very slow rate of change in the loading pressure. It is further apparent that the valve or other regulating device must be positioned by the servo-motor substantially instantaneously and in exact accordance with changes in loading pressure if the control system is to perform its primary function, which is to maintain the controlled condition at the standard, or return it toward the standard upon departure therefrom.

Valves and other agent regulating devices as commonly used in industry are often of large size requiring a powerful servo-motor for proper operation. Obviously in all cases a certain amount of friction will be present in such servo-motors and the associated valve or regulator. Where the servo-motor is used to operate a valve or damper additional friction will be introduced, due to the necessary pressure packing while the power required to operate the valve in one direction as compared to that required to operate it in the other direction may be quite different due to the action of the pressure against the movable valve or damper from the agent. Small changes in loading pressure may be insufficient to overcome this friction and accordingly the agent regulating device may not be positioned precisely proportional to changes in the condition, nor continuously in accordance with the amount of deviation in the controlled condition from the standard as is sometimes desired.

My invention particularly relates to apparatus for insuring that the agent regulator is accurately and instantaneously responsive to changes in the loading pressure regardless of how minute such changes may be. In my invention I utilize the loading pressure to operate suitable valve or relay means to admit fluid under a relatively high pressure to the servo-motor, or to discharge fluid therefrom, until the position of the servo-motor is in predetermined relation to the magnitude of the loading pressure.

A principal object of my invention is to provide fluid pressure responsive servo-motors arranged to take into account the capacity, range, leakage, flow characteristics and other variables of the valves, dampers, and the like which the servo-motor positions and to produce a desired relationship between loading pressure and rate of flow of the fluid, or rate of change of the variable, being controlled.

Another object is to provide means for correlating a plurality of variables under the control of a single condition or effect and where the controlled variables may have different characteristics of capacity, range, etc. A particular example of such a desideratum is the proportioning flow of liquid fuel and air for combustion in a furnace. In such an installation the characteristics of a valve controlling the flow of liquid fuel and the characteristics of a damper controlling air for combustion of the fuel may differ widely as to range, initial leakage, flow-movement characteristics and the like. By the use of my invention I may predetermine a majority of the dissimilarity between the flow characteristics and take it into account in the design of the apparatus and later, in making the installation, make the necessary adjustments to the servo-motors involved so as to accurately parallel the control of the two fluids for proper proportioning thereof.

Further features of my invention will become apparent from the following description and from the drawings in which:

Fig. 1 is a diagrammatic illustration of a typical control installation to which my invention may be applied.

Fig. 3 is a graph in connection with Fig. 1.

Fig. 6 illustrates the application of my invention to the valve of Fig. 1.

Fig. 7 illustrates the application of my invention to the damper controller of Fig. 4.

Fig. 8 is a diagrammatic illustration of another embodiment of my invention applied to a damper regulator.

Figure 4:
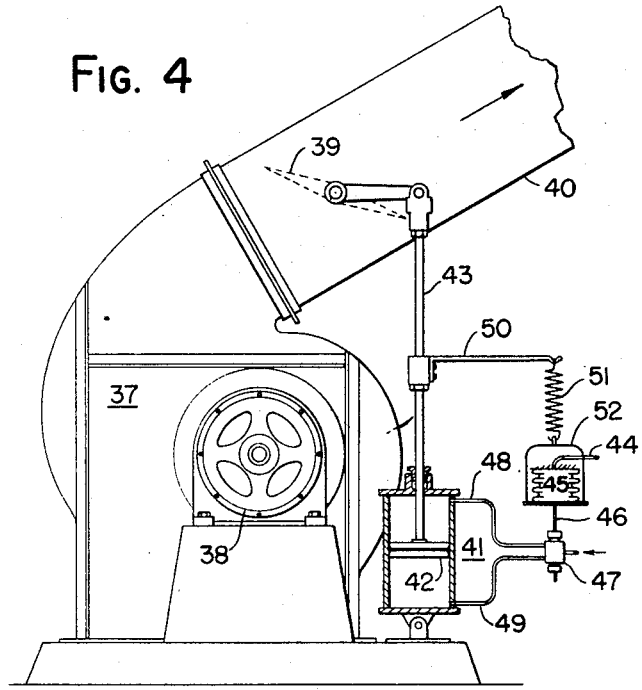
Fig. 4 is a diagrammatic illustration of a damper controller to which my invention may be applied.

Referring to Fig. 1, I therein show an energy utilizing device, such as a tank 1, which is maintained at a predetermined or desired temperature by an agent, such as steam for example, supplied through a conduit 2 in which is located a regulating valve 3.

The temperature within the tank 1 is determined by means of a thermometric system comprising a bulb 4 connected to a Bourdon tube 5 by means of a capillary 6. The bulb 4, Bourdon tube 5 and capillary 6 are filled with an inert gas, liquid or vapor so that the pressure therein varies in consonance with variations in temperature within the tank 1. As the temperature within the tank 1 increases, the free end of the Bourdon tube 5 is positioned in a counterclockwise direction and, as the temperature decreases, it is positioned in a clockwise direction. Through the agency of the devices hereinafter to be described, the valve 3 is positioned by a fluid pressure established by the Bourdon tube 5 to vary the rate of flow of steam to maintain the temperature within the tank 1 at the desired value.

Positioned by the free end of the Bourdon tube 5 is the movable valve stem 7 of a pilot valve 8 of the type forming the subject matter of my Patent No. 2,054,464. The pilot valve 8 is shown in cross-section and to larger size in Fig. 2. A fluid under pressure, such as compressed air, is admitted to the pilot valve 8 through an inlet port 9 which opens into a passageway 10 extending longitudinally through the pilot valve and opening at either end to the atmosphere. A flow of pressure fluid is maintained from the inlet port 9 through the passageway 10 and exhausted to the atmosphere.

The movable valve member 7 carries lands 11 and 12 which are of slightly less diameter than the passageway 10, so that a pressure gradient is established by the pressure fluid flowing past them. Immediately adjacent the land 11 is an outlet port 13, while adjacent the land 12 is a similar outlet port 14. The positions of the lands 11 and 12 relative to the outlet ports 13 and 14 determine the pressure established thereat. As the movable valve member 7 is moved upwardly, (by counterclockwise movement of the free end of the Bourdon tube 5) the pressure at the outlet port 13 increases, whereas that at the outlet port 14 decreases. Conversely, when the valve member 7 is moved downwardly the pressure established at the outlet port 13 decreases, whereas that established at the outlet port 14 increases.

The valve 3 has a movable regulating member 15 controlling the flow of steam through the conduit 2. For positioning the member 15 I provide a valve stem 16 fastened to and positioned by a diaphragm 17 whose movement is opposed by a loading spring 18. Such construction is more or less common and forms no part of my present invention.

In the simplest form of fluid pressure control the air loading pressure established by the pilot valve 8, in the pipe 19 would be applied directly at the entrance 20 upon the diaphragm 17 for positioning the diaphragm and the regulating member 15. Upon a decrease in temperature at the bulb 4 the Bourdon tube 5 would move in a clockwise direction producing an increase in air loading pressure at the pilot valve outlet 14, within the pipe 19, and effective through the opening 20 upon the diaphragm 17. Such increase in loading pressure would tend to move the assembly comprising the diaphragm 17, the valve stem 16, and the regulating member 15 downwardly (on the drawing) against the reaction of the loading spring 18. Such downward positioning of the regulating member 15 would increase the rate of flow of steam through the conduit 2 to the tank 1 for raising the temperature at the bulb 4. Such a simple throttling control system is termed a geared or positioning control wherein for every value of temperature (within the regulating range) at the bulb 4, there is a definite throttling position of the member 15 and there is a definite and proportionate movement of the member 15 for each amount of temperature deviation from the desired standard or control point.

The "width of the regulating range" is the number of degrees temperature deviation across the control point (standard) necessary to travel the member 15 from completely closed to completely open position. Obviously the regulating range may be wide or narrow within design limitations. If the regulating range is wide, then it requires a considerable change in temperature at bulb 4 before any appreciable change is accomplished in rate of supply of steam through the conduit 2. If the regulating range is narrow, then the member 15 may move from wide open to tight shut position for a very small deviation in temperature at bulb 4. It is evident that for every rate of heat dissipation from the tank 1 there is a corresponding heat level or temperature at the bulb 4 and a proportionate inlet valve opening.

The advantage of positioning control is that it is capable of very stable operation even in cases where there is considerable delay between a variation of agent input and the responding changes throughout the system.

The disadvantage is that the control is not able to maintain the same standard or control point at all operating rates of the process. This may readily be understood, for it requires a departure of temperature before the Bourdon tube 5 and pilot stem 7 are moved, i. e. before there is a change in loading pressure effective upon the diaphragm 17 and corresponding positioning of the member 15. The system will tend to stabilize out at a temperature (other than the standard desired) wherein the heat dissipation is just satisfied by the new rate of heat supply, but there has not been the necessary overcorrection of heat supply to take care of the initial heat loss or heat gain which caused the temperature to vary. Thus a system of the positioning type will tend to stabilize out at a temperature corresponding to each valve opening position, and the width of the temperature regulating band relative to full travel of the valve member 15 is usually adjustable. It would be possible to overcome this fault (of not maintaining the desired standard) by constructing the mechanism so that complete valve travel is obtained with a negligible change in temperature. However, this would result in unstable operation since the system would now correspond to a floating control system.

In a system of the floating control type the regulating member 15 would continue to move in an opening or in a closing direction so long as the temperature were away from the standard or control point. With such a system it is apparent that alternate opening and closing of the inlet valve may continue indefinitely. This fluctuating action is known as hunting.

The advantage of the floating control is that it tends to maintain the variable (temperature in this example) at the standard or control point independent of the rate of operation of the process. For example, the temperature in tank 1 will be maintained at the standard value as an average regardless of the rate of heat dissipation or heat input.

The disadvantage is that where there is a storage capacity, as in the tank 1, or where a time interval exists between the moment a change is made in the agent and the moment this change affects the measuring device or controller, overtravel or hunting occur.

The most desirable control system is one combining the advantages of positioning and floating control. This is sometimes termed a combination of proportioning and reset control. I accomplish the desideratum by interposing in the conduit 19 between the pilot 8 and the opening 20 a standardizing relay 21 of the type disclosed and claimed in the patent to Gorrie Re. 21,804. Such a relay provides a combination "floating-positioning control" to first give a rate of response proportional to the rate of change in magnitude of the condition being controlled and thereafter to give a continuing response initially proportional to the amount of deviation of the controlled condition from the desired magnitude (control point or standard). It superimposes a secondary slow speed positioning control of relatively high sensitivity upon a primary high speed positioning control or relatively low sensitivity to prevent stabilizing out at a value other than the standard desired. It gives an immediate response followed by a slow continuing response in the same direction employing a feedback or regenerative effect. Such a relay combines the advantages of the two methods of control described above without any of the disadvantages. The controller comprising the Bourdon tube 5 and pilot valve 8 may be adjusted for a wide positioning range insuring stable operation, yet the stabilizing relay introduces a floating action to maintain a definite standard or control point.

The standardizing relay 21 consists essentially of chambers A and B separated by a bellows or diaphragm member 22, and chambers C and D separated by a bellows 23. Chambers B and C are sealed from each other by a bellows. The spring 24 and the two bellows 22, 23 are attached to a center post 25. With a small movement of the post 25 downwardly, the post acts on a pivoted beam 26 to open an admission valve 27 and close an exhaust valve 28. With an upward movement the exhaust valve 28 opens and the admission valve 27 closes.

Assuming for the moment that chambers B and C are open to the atmosphere and no tension on the spring 24, any loading pressure applied to chamber A by the pilot valve 8 will move the center post 25 down to operate the valves 27 and 28 to vary the ratio of air supply to exhaust until the force under bellows 23 balances that above bellows 22. Since the bellows are of equal area the pressure in chamber D then, which positions the control valve member 15, would always be equal to the pressure in chamber A. Thus the relay 21 would function simply as a relay valve under the assumed condition, and the control would act only as a positioning type inasmuch as the pilot valve 8 is of the positioning type. It will be remembered that we are assuming that the pressure established in the chamber D is effective through the pipe 19A directly at the opening 20 upon the diaphragm 17. The magnitude in change of position of the regulating member 15 would be proportional to the magnitude of variation in temperature at the bulb 4.

Actually only chamber B is open to the atmosphere and a connection exists between chambers D and C as shown in Fig. 1. The tension of spring 24 is adjusted to balance the force exerted on bellows 22 by a predetermined normal pressure in chamber A when the pressures in chambers D and C are equal. Now if the loading pressure in chamber A is increased, the initial action will tend to increase the control pressure in chamber D an equal or proportionate amount. However, the control pressure will immediately start to bleed through the throttling valve 29 into the chamber C. The increasing pressure in chamber C forces the post 25 downward to increase the pressure in chamber D still more. Therefore the action is regenerative and the pressures will continue increasing to a maximum unless the loading pressure in chamber A returns to its initial value. A reverse action occurs when the loading pressure decreases from neutral.

It is evident that the system will be in equilibrium only when the predetermined loading pressure exists in the pipe 19 for the standard or control point temperature at the bulb 4. When a change in temperature causes the loading pressure to deviate from the normal value, a continuous change is made in the control pressure in pipe 19A and in the position of regulating member 15 until the relay 21 is restored to balance by a return of the temperature to the standard value and a return of the loading pressure in pipe 19 to its normal or predetermined value. As the loading pressure approaches normal its effect on the bellows 22 retards the regenerative action of the bleed to chamber C so that the control pressure gradually comes to rest at the correct value when the loading pressure is again at normal. The speed of this "floating" action may be adjusted with the throttling valve 29 to harmonize with the response of the process so that the condition (temperature) is restored to standard without overtravel or hunting of either the temperature or of the control mechanism.

The control system just described would produce a satisfactory regulation of temperature within the tank 1 if the moving parts of the regulating valve 3 are positionable without friction and if the flow characteristic of the valve 3 is linear from zero rate of flow to the desired maximum rate of flow or maximum rate of heat supply to the tank 1. I have found from practical experience that commercial valves, such as indicated at 3, are not free from friction and that, therefore, the application to the diaphragm 17 of a predetermined control pressure does not necessarily insure the desired position of the member 15. For example, assume that it requires a variation of one p. s. i. in control pressure effective upon the diaphragm 17 to overcome inertia and friction of the moving parts of valve 3. If a control pressure variation of .5 p. s. i. is applied to the diaphragm 17 then the moving parts of the valve 3 are non-responsive and no variation in rate of flow through the conduit 2 is accomplished where obviously it is desired that a change in rate of heat input is to be proportional to the change of .5 p. s. i. in loading pressure. To overcome this inherent friction or inertia of parts in the regulating valve 3 I insert in the pipe 19A ahead of the opening 20 a relay mechanism 30, such as is described and claimed in the Gorrie Patent 2,179,450.

In the relay 30 the control pressure effective in the pipe 19A is applied to an expansible chamber having a movable wall 31 fastened to a rod 32 whose lowermost end is adapted to actuate a supply and waste valve for admission of air to, or discharge to the atmosphere from, a chamber 33 connected by the pipe 34 to the inlet 20. Movement is opposed by a spring 35. Spring loading is accomplished by a fulcrumed arm 36, one end of which is positioned by and with the diaphragm 17. Thus the loading of the spring 35 is directly in accordance with the position of the regulating member 15 irrespective of inertia, friction or other detrimental effects upon the elements 15, 16 and 17.

Upon an increase in pressure in the pipe 19A the rod 32 tends to move upwardly against the action of the spring 35 causing an opening of the inlet valve to increase the pressure within the chamber 33, which increase in pressure is simultaneously effective through the pipe 34 upon the diaphragm 17. If the resulting movement of the rod 16, and thereby of the arm 36, is sufficient to so load the spring 35 as to overcome the increase in pressure upon the bellows 31, then the stem 32 will be positioned downwardly a proportionate amount necessary to return the supply and waste valves to their previously balanced or neutral position, confining in the chamber 33 the new pressure which had been applied to the diaphragm 17. It is immaterial whether this new pressure in the chamber 33 (and effective in positioning the diaphragm 17) is equal to that existing within the pipe 19A or in direct proportion thereto, just so long as the increase is sufficient to overcome inherent inertia and friction of the parts and cause the regulating member 15 to move to a position corresponding to the pressure in 19A. In other words, the system now produces a definite positioning of the regulating member 15 for each and every control pressure established in the pipe 19A irrespective of the pressure applied to the diaphragm 17. Assuming a straight line characteristic of steam flow through the conduit 2 with positioning of the regulating member 15, then each value of pressure in the pipe 19A predetermines a definite predictable rate of steam flow through the conduit 2.

I come now to the second variable in the construction of the valve 3 previously mentioned, namely, the characteristic or functional relation between movement of the member 15 and rate of flow of steam therethrough. Such characteristic or functional form may vary with the amount and shape of port opening, the direction and shape of flow passages through the valve, and and other variables affecting a linear relation between increments of movement of the member 15 and incremental changes in rate of fluid flow through the valve. By way of example, I refer to Fig. 3 wherein I have plotted several possible graphs of relationship between "percent of valve motion" and "percent rate of flow." Curve E depicts the desired lineal relation from zero rate of flow at tight closed valve position to a maximum rate of flow with a wide open valve.

It is frequently found that when such a valve is in what is presumed to be a shutoff position there may be as high as ten or fifteen percent leakage past the seats. Thus curve F depicts a linear relation starting with fifteen percent steam leakage at shutoff valve position, and ending with maximum rate of flow at wide open valve position.

In designing a process and applying commercial apparatus thereto it is rather infrequent that exactly the desired maximum rate of flow of fluid through the valve is accomplished at exactly maximum valve opening position. Frequently the maximum flow capacity of the valve falls short or exceeds the desired maximum rate of flow.

Thus in curve G I indicate a linear characteristic with fifteen percent leakage at valve shutoff position, but attaining maximum desired rate of steam flow with the valve only seventy-five percent open. In curve H I indicate that one hundred percent of valve motion produces only seventy percent as much rate of steam supply as is needed.

Such conditions are commonly found in existing process systems when one attempts to apply thereto a control system. In the past it has been necessary, when such conditions are found in existing valves, to redesign and replace the inner valve parts in an attempt to overcome these inherent difficulties and to approach or approximate a characteristic curve such as E. It is to be remembered that the discussion of the curves of Fig. 3 is premised on linear relationship which is the exception rather than the rule, particularly when attempting to apply a control system to an existing regulating valve. Manufactures of such valves shape the ports and employ all of the expedients at their command to attain a linear or predetermined desired characteristic of flow vs. motion. A particular object of the present invention is to easily accommodate a standard regulating mechanism to valves of undesirable characteristics and compensate therefor in the positioning of the valve member. Furthermore, to provide the possibility of changing the valve or regulator characteristic on an operating installation, and finally to take into account the characteristics of a plurality of regulators and correlate them to produce an integrated control system of a process, or specifically in the proportioning of a plurality of flowing fluids in desirable degree and manner.

Referring now to Fig. 4, I illustrate therein a regulating system which is somewhat similar in function to that described in connection with Fig. 1, but wherein a pneumatic servo-motor positions a damper in the discharge of a fan driven at uniform speed for regulating the flow of air or the products of combustion for example. Such a fan might be the forced draft fan supplying air for combustion to a furnace, or it might be the induced draft fan taking the products of combustion away from a furnace. I indicate a fan 37 driven at uniform speed by a motor 38 forcing a gaseous fluid past a damper 39 in a duct 40. For positioning the damper 39 to regulate the rate of flow of fluid through the duct 40 I provide a servo-motor 41 comprising essentially a piston 42 and piston rod 43. The servo-motor 41 is under the control, for positioning thereof, of a fluid loading pressure effective through a pipe 44 upon an expansible chamber such as a bellows 45 which in turn positions the stem 46 of a pilot valve 47. The pilot valve 47 is similar to the pilot valve 8 of Fig. 3 and controls the effectiveness of a pressure fluid through the pipes 48, 49 upon opposite sides of the piston 42 for positioning the latter.

Moved by and with the piston rod 43 is an arm 50 carrying one end of a spring 51. The other end of the spring 51 is attached to a yoke 52, which is rigidly fastened to the movable wall of the expansible chamber 45. If pressure within the pipe 44 increases, then the lower or movable wall of the bellows 45 is positioned downwardly carrying the pilot stem 46. Such action results in an increase in fluid pressure effective in the pipe 49 and a decrease in fluid pressure effective through the pipe 48. The result is an upward positioning of the piston 42 and piston rod 43. Such upward motion of the rod 43 carries with it the arm 50 and tends to elongate the spring 51. The additional loading or tension on the spring 51 places an upward acting force upon the yoke 52 and upon the movable wall of the bellows 45 thus opposing the increase in pressure within the chamber 45 previously mentioned. Such action persists until the increased loading of the spring 51 balances the increase in pressure within the chamber 45, returning the pilot stem 46 to neutral position wherein the pipes 48, 49 are locked across the piston 42 and further motion of the piston 42, piston rod 43, and arm 50 is arrested.

The action just described is similar to that accomplished by the relay 30 of Fig. 1 constituting a mechanical tie-back from the controlled member to balance the loading pressure irrespective of inertia, friction or other deleterious effects contributed by the actual apparatus being positioned.

It will be apparent that I have described, by way of example, two basic types of regulating devices, namely, the regulating flow valve of Fig. 1 and the regulating damper of Fig. 4. Fluid pressure servo-motors have been, and will be, applied to a wide variety of regulating structures of which the valve and damper have been chosen only as examples. Other devices encountered and desirably positioned by fluid pressure servo-motors may constitute electrical rheostats, Reeves drives, fluid couplings and other speed or flow or condition controlling devices.

Figure 5:
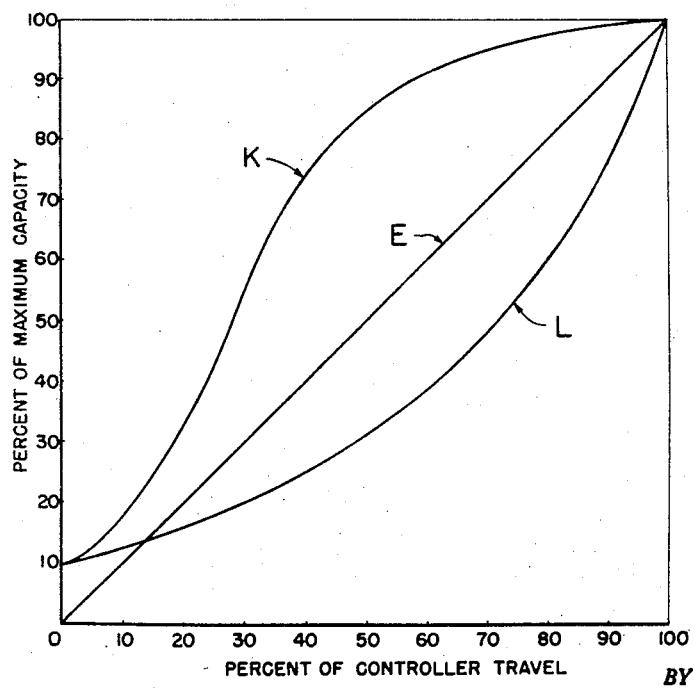
Fig. 5 is a graph of characteristic travel-flow curves.

While in Fig. 3 I explain certain characteristic graphs on the premise of a linear relationship between valve motion and rate of flow, it is to be appreciated that in a large percentage of installations the relationship will not be linear, but may be curved in concave or convex form. To illustrate, I now refer to Fig. 5. The curve E corresponds to the desired curve E of Fig. 3, namely, a linear relationship between percent of controller travel and percent of maximum capacity. Curve K indicates a typical characteristic of a damper, such as the damper 39 of Fig. 4, wherein there may be an initial leakage of approximately ten percent fluid flow across the damper upon presumed shutoff conditions. Whether the damper 39 is a single leaf damper or of a louvre type, the curve K is in general shape what may be expected.

Curve L is a typical curve from a Reeves drive inserted between a constant speed motor and a driven device which may be a fan pump, fuel stoker, or the like. In each of curves K and L I assume that the maximum damper opening and the maximum speed position of the Reeves drive will exactly produce the desired maximum rate of capacity, such as fluid flow or the like being controlled. This is usually not the case. As a matter of fact if the damper curve K follows the air supply to a furnace and the Reeves drive curve L follows the fuel supply to a furnace, it is usually found that the maximum capacities of the two are not equal and that the characteristics are not lineal.

In general then the situation with regard to regulating devices, such as valves, dampers, Reeves drives, and the like, to be positioned by fluid pressure servo-motors is that the characteristic curves may or may not be linear, they may or may not start at the same minimum, they may or may not end at the same maximum capacity, and they may or may not parallel each other as to shape. In connection with such conditions it is a primary object of my present invention to accomplish three particular objects:

1. To so construct the servo-motor regulator that the characteristic approaches a linear function.

2. To provide that such regulators may have characteristics approaching linear function, or similar slope, and with substantially the same minimum and maximum values whereby controlled functions or rates may be paralleled.

3. To provide the ready possibilities in the field and in service of changing the range of a controlled variable and of changing or compensating for an undesirable characteristic or functional relationship between controller movement and magnitude of the control value or agent.

Referring now to Fig. 6, I illustrate in somewhat diagrammatic fashion the application of my invention to the regulating valve 3. The control pressure established in the pipe 19A is effective within an expansible chamber such as a bellows 53. Movement of the movable wall of the bellows 53 is opposed by an elliptical leaf spring 54 whose other side carries a roller 55 riding a cam surface 56. The cam 56 is positioned by and with the valve stem 16 and therefore the position of the cam 56 is directly representative of the position of the regulating member 15 relative to its seat. Positioned by and with the free end of the bellows 53 is an arm 57, in turn positioning the stem 58 of a pilot 59 for establishing a control pressure within the pipe 34 effective upon the diaphragm 17. It thus becomes evident that the spring 54 is variably loaded, depending upon the position of the cam 56 and correspondingly the position of the regulating member 15. Such variable loading of the spring 54 is effective in opposing expansion of the chamber 53 and the two together control the positioning of the arm 57 and thereby the pressure established within the pipe 34.

Assume an increase in loading pressure effective through the pipe 19A upon the interior of the bellows 53. The left-hand end (on the drawing) of the bellows 53 moves toward the left against the action of spring 54. Such movement pivots the bell crank 57 in a counterclockwise motion, thus raising the stem 58 relative to the housing 59 and producing an increase in pressure within the pipe 34 effective upon the diaphragm 17. Such increase in pressure causes a downward positioning of the valve stem 16 and of the cam 56. Downward movement of the cam 56 against the roller 55 forces the latter towards the right, thus loading up the spring 54 against the increased pressure within the bellows 53 and tending to return the bell crank 57 in clockwise rotation to its previous position. Such previous position is attained when the increased loading of the spring 54, through the agency of the cam 56, is equal to and overcomes the increase in pressure in the pipe 19A and chamber 53.

It is evident that I may so shape the cam 56 as to counteract a non-linear functional relation between movement of the part 16 and rate of flow of steam through the valve 3 and approach a linear relationship therebetween. Furthermore, the shape of the cam 56 may change the slope of a curve, such as F, G or H. For example, if the actual capacity for fluid flow past the valve 3 is 150% of that necessary to supply the tank 1, then the cam 56 may be so shaped as to accomplish a regulation of only 66⅔% of the capacity (150%) of the valve 3 for full range in operating pressures effective upon the diaphragm 17. In like manner any one of the curves H, F or G may be varied as to slope and as to range.

It will, of course, be evident that I am not limited in the use of a bellows 53, for I might equally as well use a diaphragm or similar device. Also the spring or loading means 54 may assume other forms or shapes and still accomplish the desired action. Furthermore, the cam 56 may be shaped in any of numerous forms and still accomplish a correction of undesirable characteristic of the regulating valve or device.

Referring now specifically to Fig. 7, I indicate thereon the adaptation of my invention to the servo-motor 41 of Fig. 4. Herein a cam 60 is positioned by and with the piston rod 43 for effecting a control of the movement of the valve stem 58 relative to the pilot valve housing 59. Such movement controls the pressure fluid in the pipes 61, 62 effective on opposite sides of the piston 42 for positioning the piston rod 43 and the cam 60. It will thus be evident that I have a mechanism universally applicable to valves and other types of servo-motors differing only in the shape and construction of the cam to accommodate total travel of the controlled objects, characteristics, etc.

A particular object of my invention is to so inter-relate or correlate the regulation of a plurality of variables as to overcome, or compensate for, the differening characteristics thereof. By way of example I refer to the proper proportioning of fuel and air to a furnace.

Assume that the regulating valve 3 is installed in a fuel oil line supplying fuel to a furnace. The arrangement of Fig. 4 may comprise the induced draft fan and uptake damper of the furnace. The supply of fresh air for combustion may be by natural draft suction around the oil burner. In such a combustion control system it is desired to simultaneously control the rate of supply of fuel oil and the rate of flow of the products of combustion from the furnace, both from a single variable, such for example as steam pressure being produced in a vapor generator heated by the furnace. It is appreciated by those familiar with the art that a control of the taking away of the products of combustion is also a control of the supply of fresh air for combustion, inasmuch as the suction created upon the furnace by the induced draft regulates the inflow of fresh air around the fuel burners.

As previously pointed out, the characteristics of a valve such as 3 in the fuel oil supply line may differ radically from the characteristics of a controllable damper 39 in the furnace uptake. Not only may the amount of initial leakage be different, but maximum capacities as well as the functional relation between regulator motion and rate of flow. It is possible to predict in general the shape of the characteristic curve of controllable apparatus. For example, it is well known the general shape of a damper curve and also the expected characteristic for such a valve as 3. Thus initially the cams 56 and 60 may be prepared along what may be termed average lines. When the installation is made and placed in operation it is then possible to ascertain the exact relationship between the supply of fuel and air at different rates of operation and to so change the shape of the cams 56, 60 as to bring the supplies of the elements of combustion into optimum relation or proportion. The advantage of this procedure is readily apparent as compared to present day practice and possibilities. At present it would be necessary to shut down the unit and replace the regulating members 15 to change the flow characteristics through the valve 3, and by cut and try methods attempt to obtain the most desirable characteristic for the valve. In similar manner angularity changes in the linkage, etc. would have to be made in an attempt to not only straighten out the characteristic of the damper 39, but to bring it into desired relationship with the characteristic of the valve 3. Compared to these crude and inefficient and often ineffective makeshifts of present day practice the present invention allows an approximation of desired relationship before the installation is placed in service and thereafter a correction (if one is necessary) without interfering with operation of the process.

While I have chosen to particularly refer to the proportioning of fuel and air to a combustion process, it will be appreciated that the invention is equally applicable to the proportioning of fluid flows, such as for example the mixing in proper proportion of a plurality of chemicals or of any liquids or fluids.

In Fig. 8 I illustrate another embodiment which my invention may take. The servo-motor 41 has a piston 42 driving a piston rod 43 as previously pointed out. Moved by and with the piston rod 43 is a rack 63 adapted to turn a gear 64 carrying a cam 65 which I shape to change the characteristics if change is needed. Riding the surface of the cam 65 is a roller 66 carried by a pivoted beam 67 for positioning the stem 68 of a pilot valve establishing in the pipe 69 and expansible chamber 70 a fluid pressure representative of position of the piston rod 43 modified by shape of the cam 65. Where more than a partial range of travel of piston 42 is required, the gear 64 and cam 65 can be made larger. The movable wall 71 of the expansible chamber 70 is tied by a yoke 72 to the movable wall 73 of an expansible chamber 74 to which is led a fluid pressure through the pipe 19B established at the pilot valve 8A. Positioned by the yoke 72 is the stem 75 of a pilot valve 76 regulating the fluid pressure effective through the pipe 77, 78 on opposite sides of the piston 42.

The Bourdon tube 5A is representative of any measuring device sensitive to the value of a variable to be controlled by the regulation of an agent by piston rod 43. If the stem 7A is raised then the pressure effective in pipe 19B is increased, thus increasing the pressure within chamber 74, causing a downward positioning of the stem 75. Such movement of the stem 75 increases the pressure within pipe 78 and decreases that within pipe 77, resulting in an upward positioning of the piston 42 and piston rod 43. Such upward positioning of the rack 63 rotates the gear 64 in a direction to raise the stem 68, thus increasing the pressure in the pipe 69 and chamber 70 until the pressures within the chambers 70, 74 are again equal, whereupon the stem 75 has been returned to its previous position relative to the valve 76 and pressure is locked in the pipe 77, 78, thereby stopping movement of the piston 42, the piston rod 43, the rack 63 and the stem 68.

Figure 2:
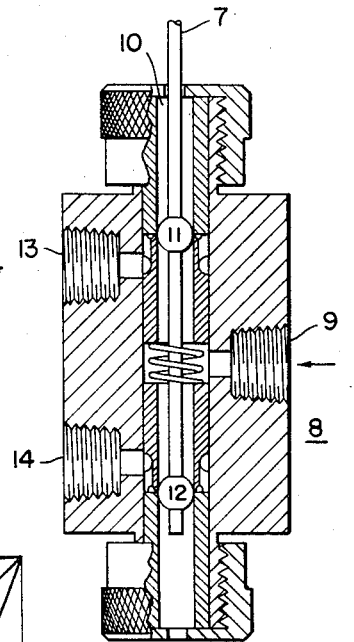
Fig. 2 is a sectional elevation of a pilot valve.

Reverting for the moment to Fig. 2, it is to be understood that either the outlet 13 or the outlet 14 is used depending upon whether an increase or a decrease in air loading pressure is desired for a lifting of the stem 7. The unused port 13 or 14 would be closed with a pipe plug or other means. In the pilot valves indicated at 41, 59 and 76 both ports 13 and 14 are used.

The examples I have given are representative only and not to be considered as limiting.

What I claim as new, and desire to secure by Letters Patent of the United States, is:

1. A regulator for a control element comprising, in combination, a cylinder having a piston reciprocably received therein, a piston rod connected to said piston and adapted to be connected to said control element, means including a pilot valve for connecting the ends of said cylinder selectively to a pressure fluid supply and to exhaust, a bell crank having one of its arms connected to the valve stem of said pilot valve, a bellows supported at one of its ends on a stationary abutment and having its other end engaging one side of a second arm of said bell crank, means adjustable longitudinally of said piston rod and adapted to be fixed thereto at any point along its length, said last mentioned means presenting a surface inclined relative to the axis of said piston rod, a bowed spring acting against the second arm of said bell crank in opposition to said bellows, means for supplying fluid to the interior of said bellows at pressures varying with the operation of the control element, and means fixed to said spring and supporting a roller in engagement with said surface.

2. A regulator for a control element comprising, in combination, a fluid motor including a linearly oscillating pressure responsive member and a chambered housing therefor, a rod connected to said pressure responsive member and adapted to be connected to said control element, means including a stemmed pilot valve for connecting at least one side of said pressure responsive member through said housing to a selectively variable pressure fluid supply, a bell crank having one of its arms connected to the valve stem of said pilot valve, to vary said pressure fluid supply, a bellows supported at one of its ends on a stationary abutment and having its other end engaging one side of a second arm of said bell crank, means secured to said rod externally of said housing, said last mentioned means presenting a surface inclined relative to the axis of said rod, a bowed spring acting against the second arm of said bell crank in opposition to said bellows, means for supplying fluid to the interior of said bellows at pressures varying with the operation of the control element, and means fixed to said spring and supporting a roller in engagement with said inclined surface.

3. A regulator for a control element comprising, in combination, a diaphragm type fluid motor including an expansion chamber on one side of the diaphragm, a rod connected to and projecting from the other side of the diaphragm, said rod being adapted to be connected to said control element, means including a stemmed pilot valve for connecting the expansion chamber of said fluid motor to a selectively variable pressure fluid supply, a bell crank having one of its arms connected to the valve stem of said pilot valve to vary said pressure fluid supply, a bellows supported at one of its ends on a stationary abutment and having its other end engaging one side of a second arm of said bell crank, means secured to said rod, said last mentioned means presenting a surface inclined relative to the axis of said rod, a bowed spring acting against the second arm of said bell crank in opposition to said bellows, means for supplying fluid to the interior of said bellows at pressures varying with the operation of the control element, and means fixed to said spring and supporting a roller in engagement with said inclined surface.

CLARENCE JOHNSON.

REFERENCES CITED

The following references are of record in the file of this patent:

UNITED STATES PATENTS

| Number | Name | Date |
| --- | --- | --- |
| 1,666,270 | Soderberg | Apr. 17, 1928 |
| 1,798,932 | Drieske | Mar. 31, 1931 |
| 1,961,343 | Donaldson | June 5, 1934 |
| 2,044,936 | Donaldson | June 23, 1936 |
| 2,102,504 | Beardsley | Dec. 14, 1937 |
| 2,220,180 | Spitzglass | Nov. 5, 1940 |
| 2,237,038 | Moore | Apr. 1, 1941 |
| 2,241,330 | Shaw | May 6, 1941 |
| 2,291,048 | Lichtenstein | July 28, 1942 |

FOREIGN PATENTS

| Number | Country | Date |
| --- | --- | --- |
| 459,893 | Great Britain | Jan. 18, 1937 |